(12) United States Patent
Zhang et al.

(10) Patent No.: US 12,502,929 B2
(45) Date of Patent: Dec. 23, 2025

(54) OPERATING METHOD FOR AIR CONDITIONING SYSTEM FOR VEHICLE, AND AIR-INTAKE SYSTEM THEREOF, AND VEHICLE

(71) Applicant: GREAT WALL MOTOR COMPANY LIMITED, Baoding (CN)

(72) Inventors: Weili Zhang, Baoding (CN); Haiming Liu, Baoding (CN); Fuhai Duan, Baoding (CN); Shuyan Wang, Baoding (CN); Haiyang Xing, Baoding (CN); Fang Meng, Baoding (CN); Jian Xu, Baoding (CN); Xiaocui Wu, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 623 days.

(21) Appl. No.: 17/910,560

(22) PCT Filed: Feb. 25, 2021

(86) PCT No.: PCT/CN2021/077931
§ 371 (c)(1),
(2) Date: Sep. 9, 2022

(87) PCT Pub. No.: WO2021/179913
PCT Pub. Date: Sep. 16, 2021

(65) Prior Publication Data
US 2023/0150337 A1    May 18, 2023

(30) Foreign Application Priority Data
Mar. 10, 2020  (CN) .......................... 202010162881.2
Mar. 10, 2020  (CN) .......................... 202020294594.2

(51) Int. Cl.
*B60H 1/00*    (2006.01)

(52) U.S. Cl.
CPC ..... *B60H 1/00842* (2013.01); *B60H 1/00514* (2013.01); *B60H 1/00671* (2013.01); *B60H 1/00764* (2013.01); *B60H 1/00807* (2013.01)

(58) Field of Classification Search
CPC .. B60H 1/00; B60H 1/00685; B60H 1/00842; B60H 1/00807; B60H 1/00671;
(Continued)

(56) References Cited

U.S. PATENT DOCUMENTS 6,508,703 B1 *  1/2003  Uemura ............. B60H 1/00692
                                                    454/121

FOREIGN PATENT DOCUMENTS

| CN | 101403524 A | 4/2009 |
|---|---|---|
| CN | 106274352 A | 1/2017 |

(Continued)

OTHER PUBLICATIONS

EP 21767904.2 Extended European search report dated Aug. 2, 2023.
(Continued)

*Primary Examiner* — Harry E Arant
(74) *Attorney, Agent, or Firm* — IPro, PLLC

(57) ABSTRACT

The present application discloses an air conditioning system for a vehicle and an operating method therefor. The system includes a motor, an operating dial and internal and external-circulation ventilation doors, and the motor drives the operating dial to drive the internal and external-circulation ventilation doors to rotate to achieve the purpose of different internal and external air-intake ratios. The operating method includes: receiving a pulse signal having a preset direction of rotation and a preset step count of rotation of the motor; and driving the motor to rotate in the preset direction by the preset step count, to drive the operating dial to rotate, to cause the internal-circulation ventilation door to rotate to a
(Continued)

first preset angle, and cause the external-circulation ventilation door to rotate to a second preset angle.

13 Claims, 6 Drawing Sheets

(58) Field of Classification Search
CPC ............ B60H 1/00849; B60H 1/00764; B60H 1/00514; B60H 1/00857
See application file for complete search history.

(56) References Cited

FOREIGN PATENT DOCUMENTS

| | | | |
|---|---|---|---|
| CN | 206826357 | U | 1/2018 |
| CN | 207257295 | U * | 4/2018 |
| CN | 108749509 | A | 11/2018 |
| CN | 110103664 | A | 8/2019 |
| CN | 209305298 | U | 8/2019 |
| CN | 110293819 | A | 10/2019 |
| CN | 209581081 | U | 11/2019 |
| CN | 209972104 | U | 1/2020 |
| CN | 209972117 | U | 1/2020 |
| CN | 212046778 | U | 12/2020 |
| JP | 2000335228 | A | 12/2000 |
| JP | 2012218634 | A | 11/2012 |
| WO | 2018047463 | A1 | 3/2018 |

OTHER PUBLICATIONS

PCT/CN2021/077931 international search report.
CN202010162881.2 first office action and search report.
CN202010162881.2 second office action and search report.

* cited by examiner

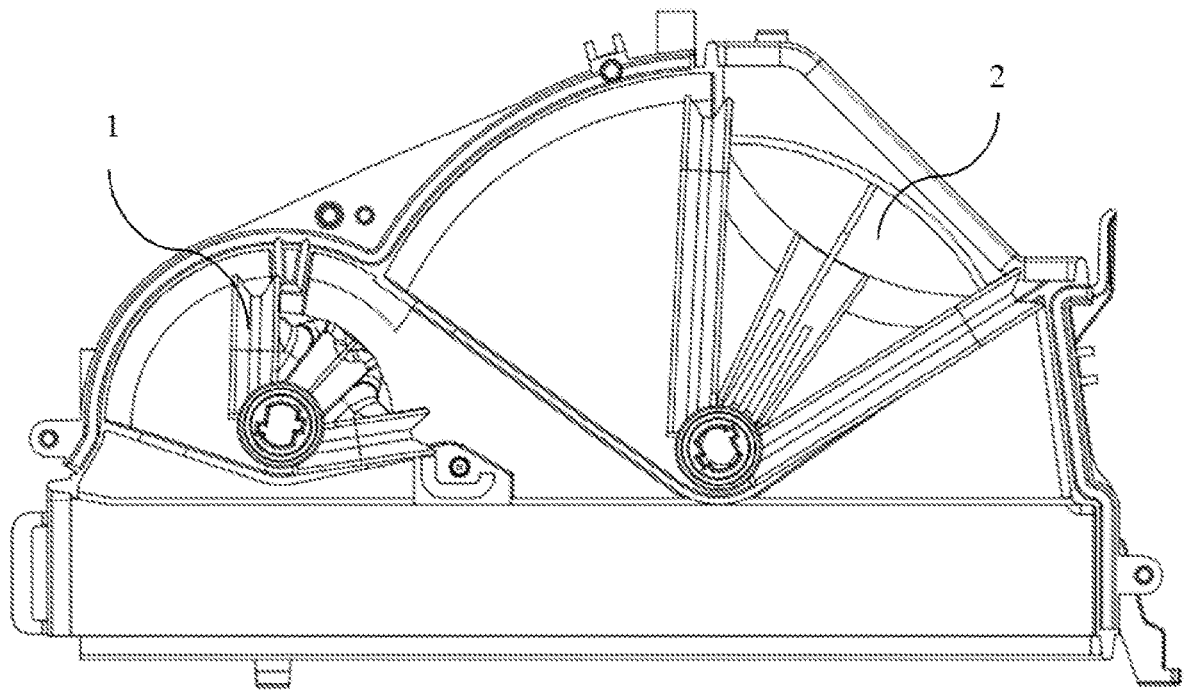

FIG.11

| receiving a pulse signal by an air-conditioner controlling unit, wherein the pulse signal includes a preset direction of rotation and a preset step count of rotation of a stepping motor | 1) |

↓

| driving the stepping motor to rotate in the preset direction by the preset step count by the air-conditioner controlling unit, to drive an operating dial to rotate, so as to cause an internal-circulation ventilation door to rotate to a first preset angle, and cause an external-circulation ventilation door to rotate to a second preset angle, so that an air-intake ratio of an internal air-intake volume to an external air-intake volume is a preset first ratio | 2) |

OPERATING METHOD FOR AIR CONDITIONING SYSTEM FOR VEHICLE, AND AIR-INTAKE SYSTEM THEREOF, AND VEHICLE

The present application claims the priorities of the Chinese patent application filed on Mar. 10, 2020 before the CNIPA, China National Intellectual Property Administration with the application number of 202010162881.2 and the title of "OPERATING METHOD FOR AIR CONDITIONING SYSTEM FOR VEHICLE" and the Chinese patent application filed on Mar. 10, 2020 before the CNIPA, China National Intellectual Property Administration with the application number of 202020294594.2 and the title of "AIR-INTAKE SYSTEM OF AIR CONDITIONER FOR VEHICLE AND VEHICLE", which are incorporated herein in their entireties by reference.

TECHNICAL FIELD

The present application mainly relates to the technical field of vehicle air conditioners, and more particularly, to an operating method of an air conditioning system for a vehicle that controls the air-intake ratio of an internal-circulation ventilation door to an external-circulation ventilation door and an air-intake system of the air-conditioner for a vehicle that controls the opening and closing of an internal-circulation ventilation door and an external-circulation ventilation door.

BACKGROUND

With the increasing higher requirements on emission reduction and energy conservation in the entire automobile industry of China, new-energy vehicles such as pure electric vehicles and hybrid power vehicles are being more and more popular, and customers also have higher requirements on comfort and energy saving of the vehicles.

Air conditioners are products that are located inside the cabin and provide comfortableness to the driver and the passengers of the vehicle. The requirements for the performances and the functions of the air conditioning systems are raised, and the structures of the air conditioning cabinets (HVAC) are increasingly more complicated. Besides the requirements for the comfortableness of the driver and the passengers such as heating, cooling, defrosting and defogging, a more important requirement is to ensure the ventilation performance of the entire vehicle. The air intake system of the air conditioner has two independent functions of internal circulation and external circulation, the internal circulation is used for the air circulation inside the cabin for the driver and the passengers, and the external circulation is used for the air intake from the exterior of the vehicle, for the circulation and exchange with the air inside the vehicle.

The structure of the internal and external-circulation ventilation doors of current vehicle models includes an internal-circulation air-intake opening, an external-circulation air-intake opening, circulating ventilation doors and an operating motor. Such a structure can satisfy the normal switching of the internal and external airs of the air conditioning systems, but has the following disadvantages. Firstly, the internal circulation and the external circulation can only realize the 100% fully opening state, but the ratio of the internal and external circulating intake air cannot be regulated. If the entire vehicle is in the process of rapid acceleration, and in the 100% fully opening state of the external circulation, the wind speed at the air-outtake opening fluctuates, which easily results in increasing of the wind speed at the air-outtake opening, and a deteriorated comfort. Secondly, in the working condition of heating in the winter, in order to prevent fogging of the entire vehicle, the air-intake system of the air conditioner is set to be of the state of external circulation. In such a state the air intake of the air conditioner is external air intake, and because the air intake has a low temperature, the temperature at the heating air-outtake opening of the cabin for the driver and the passengers increases slowly, which affects the comfort of the entire vehicle. Thirdly, regarding new-energy vehicles, when the high-pressure air heater PTC (positive temperature coefficient) configuration is used, the external circulation is applied under the working condition of heating, and at the initial stage of the heating, the temperature increases rapidly. In this case, the high-pressure air heater PTC is required to run at the 100% full power, wherein usually the power is 3 KW, which consumes the electric quantity of the entire vehicle, and affects the endurance mileage of the entire vehicle.

SUMMARY

In view of the above, the present application provides an operating method an air conditioning system for a vehicle, wherein the air conditioning system includes a stepping motor, an operating dial, an internal-circulation ventilation door and an external-circulation ventilation door, the stepping motor is fixedly connected to the operating dial, the operating dial has an internal-circulation track and an external-circulation track, the internal-circulation ventilation door and the external-circulation ventilation door have an internal connecting shaft and an external connecting shaft respectively, the internal connecting shaft and the external connecting shaft are slidable in the internal-circulation track and the external-circulation track, respectively, to drive the internal-circulation ventilation door and the external-circulation ventilation door to rotate, and the operating method the air conditioning system includes:

receiving a pulse signal, wherein the pulse signal includes a preset direction of rotation and a preset step count of rotation of the stepping motor; and driving the stepping motor to rotate in the preset direction by the preset step count, to drive the operating dial to rotate, to cause the internal-circulation ventilation door to rotate to a first preset angle, and cause the external-circulation ventilation door to rotate to a second preset angle, so that an air-intake ratio of an internal air-intake volume and an external air-intake volume of the air conditioning system is a preset first ratio.

According to an embodiment of the present application, in a preset first air-conditioning-system operation mode:

the preset direction is a counterclockwise direction, the preset step count is 0 step, the internal-circulation ventilation door rotates to the first preset angle of 0°, and the external-circulation ventilation door rotates to the second preset angle of 60°, so that the air-intake ratio of the internal air-intake volume to the external air-intake volume of the air conditioning system is 0:100.

According to an embodiment of the present application, in a preset second air-conditioning-system operation mode:

the preset direction is a counterclockwise direction, the preset step count is 1040 steps, the internal-circulation ventilation door rotates to the first preset angle of 45°, and the external-circulation ventilation door rotates to the second preset angle of 60°, so that the air-intake ratio of the internal air-intake volume to the external air-intake volume of the air conditioning system is 25:75.

According to an embodiment of the present application, the method further includes:

comparing a vehicle-speed variation value with a first preset value;

if the vehicle-speed variation value exceeds the first preset value, comparing a blower blast-volume shift of the air conditioning system with a second preset value;

if the blower blast-volume shift is less than the second preset value, determining whether the internal-circulation ventilation door rotates to the first preset angle of 0° and whether the external-circulation ventilation door rotates to the second preset angle of 60°; and if the first preset angle is 0° and the second preset angle is 60°, executing the second air-conditioning-system operation mode.

According to an embodiment of the present application, in a preset third air-conditioning-system operation mode:

the preset direction is a counterclockwise direction, the preset step count is 1840 steps, the internal-circulation ventilation door rotates to the first preset angle of 75°, and the external-circulation ventilation door rotates to the second preset angle of 60°, so that the air-intake ratio of the internal air-intake volume to the external air-intake volume of the air conditioning system is 35:65.

According to an embodiment of the present application, in a preset fourth air-conditioning-system operation mode:

the preset direction is a counterclockwise direction, the preset step count is 2440 steps, the internal-circulation ventilation door rotates to the first preset angle of 75°, and the external-circulation ventilation door rotates to the second preset angle of 39°, so that the air-intake ratio of the internal air-intake volume to the external air-intake volume of the air conditioning system is 55:45.

According to an embodiment of the present application, in a preset fifth air-conditioning-system operation mode:

the preset direction is a counterclockwise direction, the preset step count is 3040 steps, the internal-circulation ventilation door rotates to the first preset angle of 75°, and the external-circulation ventilation door rotates to the second preset angle of 21°, so that the air-intake ratio of the internal air-intake volume to the external air-intake volume of the air conditioning system is 80:20.

According to an embodiment of the present application, in a preset sixth air-conditioning-system operation mode:

the preset direction is a counterclockwise direction, the preset step count is 3840 steps, the internal-circulation ventilation door rotates to the first preset angle of 75°, and the external-circulation ventilation door rotates to the second preset angle of 0°, so that the air-intake ratio of the internal air-intake volume to the external air-intake volume of the air conditioning system is 100:0.

According to an embodiment of the present application, the method further includes:

determining temperature intervals or a speed interval of an outdoor temperature T1, an engine water temperature T2, a preset air-conditioner temperature T3, an indoor temperature T4 and a speed of a vehicle-speed signal V1; and when the outdoor temperature T1 is within a first preset temperature interval, the engine water temperature T2 is within a second temperature interval, the preset air-conditioner temperature T3 is within a third temperature interval, the speed of the vehicle-speed signal V1 is within a first speed interval, the preset air-conditioner temperature T3 is greater than the indoor temperature T4 by a first preset temperature difference, and an air conditioner has a heating demand, executing the third air-conditioning-system operation mode, the fourth air-conditioning-system operation mode or the fifth air-conditioning-system operation mode.

In the present application, by individually controlling the opening and closing of the internal and external-circulation ventilation doors, the ratio of the mixing of the internal air and the external air can be controlled, to satisfy different usage conditions. For example, in the conditions of defrosting and aeration of the entire vehicle, the internal-circulation ventilation door is closed, and the air-intake opening of the external-circulation ventilation door is fully opened. If the air conditioner is in the above-described state in which the external-circulation ventilation door is fully opened, and the vehicle speed suddenly increases or the vehicle rapidly accelerates, in this case, case easily happens that the wind speed at the air-outtake opening of the air-conditioner blown face of the dash board of the entire vehicle fluctuates. Therefore, in this case, the air-intake ratio of the internal circulating wind to the external circulating wind is selected to be 25%:75%, which can maintain a stable wind speed at the air-outtake opening, and improve the comfort of the driver and the passengers. In addition, the continuously increased air-intake proportion of the internal circulating wind may also be adapted for the case of rapid heating for reducing fogging of the windshield. As compared with the background art, the air conditioner according to the present application, in working conditions such as the rapid acceleration of the entire vehicle and prevention of fogging of the entire vehicle, may employ the mode of mixed outputting of internal and external airs at different ratios, to achieve the purpose of improving the fuel-oil economic efficiency of the entire vehicle, the endurance mileage of new-energy vehicles and the comfort of the air-conditioner blown air.

Furthermore, the present application provides an air-intake system of the air-conditioner for a vehicle, wherein the air-intake system of the air-conditioner includes:

a housing, wherein the housing includes two housing sidewall plates, a housing connecting plate, an internal blocking plate and an external blocking plate, the two housing sidewall plates are connected by the housing connecting plate and form a hollow cavity, the internal blocking plate and the external blocking plate are fixed inside the cavity, and each of the housing sidewall plates includes a first hole and a second hole;

an internal-circulation ventilation door, wherein the internal-circulation ventilation door includes an internal air-door plate and two internal end plates, the two internal end plates are connected by the internal air-door plate, the two internal end plates and the internal air-door plate form an internal air-intake opening and an internal air-outtake opening, each of the internal end plates has an internal connecting shaft, and the internal connecting shaft passes through the first hole, to cause the internal air-door plate to rotate around the first hole, to cause the internal air-door plate to abut or leave the internal blocking plate, to close or open the internal air-intake opening;

an external-circulation ventilation door, wherein the external-circulation ventilation door includes an external air-door plate and two external end plates, the two external end plates are connected by the external air-door plate, the two external end plates and the external air-door plate form an external air-intake opening and an external air-outtake opening, each of the external end plates has an external connecting shaft, the external connecting shaft passes through the second hole, to cause the external air-door plate to rotate around the second hole, to cause the external air-door plate to abut or leave the external blocking plate, to close or open the external air-outtake opening, and when the external air-outtake opening opens, the external air-outtake opening and the internal air-outtake opening are in air communication;

an operating dial, wherein the operating dial includes an internal track and an external track, the internal connecting shaft passes through the first hole and is capable of sliding in the internal track, to drive the internal air-door plate to rotate, to open or close the internal air-intake opening of the internal-circulation ventilation door, and the external connecting shaft passes through the second hole and is capable of sliding in the external track, to drive the external air-door plate to rotate, to open or close the external air-outtake opening of the external-circulation ventilation door, to mix and output airs in the internal-circulation ventilation door and the external-circulation ventilation door; and a motor for driving the operating dial to rotate.

According to an embodiment of the present application, the air-intake system of the air-conditioner further includes a connecting-arm assembly, and the connecting-arm assembly includes:

an internal connecting-arm assembly, wherein the internal connecting-arm assembly includes an internal operating arm and an internal driving arm, one end of the internal operating arm is fixedly connected to the internal connecting shaft passing through the first hole, the other end of the internal operating arm is fixedly connected to one end of the internal driving arm, and the other end of the internal driving arm is fixedly connected to the operating dial; and an external connecting-arm assembly, wherein the external connecting-arm assembly includes an external operating arm and an external driving arm, one end of the external operating arm is fixedly connected to the external connecting shaft passing through the first hole, the other end of the external operating arm is fixedly connected to one end of the external driving arm, and the other end of the external driving arm is fixedly connected to the operating dial.

According to an embodiment of the present application, the operating dial is of a disc shape, and the internal track and the external track are located on two sides of the circular disc.

According to an embodiment of the present application, the air-intake system of the air-conditioner further includes an operating-dial base, one face of the operating-dial base is adhered and fixed to the operating dial, and the other face is fixed to the stepping motor, to, by using the stepping motor, drive the operating-dial base and the operating dial to rotate.

According to an embodiment of the present application, the operating-dial base includes a through hole, and the external driving arm passes through the through hole and is fixedly connected to the operating dial.

According to an embodiment of the present application, the motor is a stepping motor.

According to an embodiment of the present application, the air-intake system of the air-conditioner further includes a fresh-air-intake pipeline, and the fresh-air-intake pipeline is in air communication with the external air-intake opening.

The present application further relates to a vehicle, wherein the vehicle includes the air-intake system of the air-conditioner stated above.

In the present application, by providing an internal-circulation ventilation door and an external-circulation ventilation door, and controlling the opening and closing of the two circulating ventilation doors, respectively, the ratio of the mixing of the internal air and the external air can be controlled, to satisfy different usage conditions. As compared with the background art, the air-intake system of the air-conditioner according to the present application, in working conditions such as the rapid acceleration of the entire vehicle and prevention of fogging of the entire vehicle, may employ the mode of mixed outputting of internal and external airs at different ratios, to achieve the purpose of improving the fuel-oil economic efficiency of the entire vehicle, the endurance mileage of new-energy vehicles and the comfort of the air-conditioner blown air.

The above description is merely a summary of the technical solutions of the present application. In order to more clearly know the elements of the present application to enable the implementation according to the contents of the description, and in order to make the above and other purposes, features and advantages of the present application more apparent and understandable, the particular embodiments of the present application are provided below.

BRIEF DESCRIPTION OF THE DRAWINGS

In order to more clearly illustrate the technical solutions of the embodiments of the present application or the prior art, the figures that are required to describe the embodiments or the prior art will be briefly introduced below. Apparently, the figures that are described below are some embodiments of the present application, and a person skilled in the art can obtain other figures according to these figures without paying creative work.

The embodiments of the present application will be described below with reference to the drawings. The drawings of the description are intended to provide a further understanding of the present application, and form part of the present application. The illustrative embodiments of the present application and their explanation are intended to interpret the present application, and do not inappropriately limit the present application.

FIG. 11 is a schematic diagram of the sixth mode of the internal-circulation ventilation door and the external-circulation ventilation door according to an embodiment of the present application; and FIG. 12 is a schematic diagram of an operating method of the air conditioning system.

Figure 1:
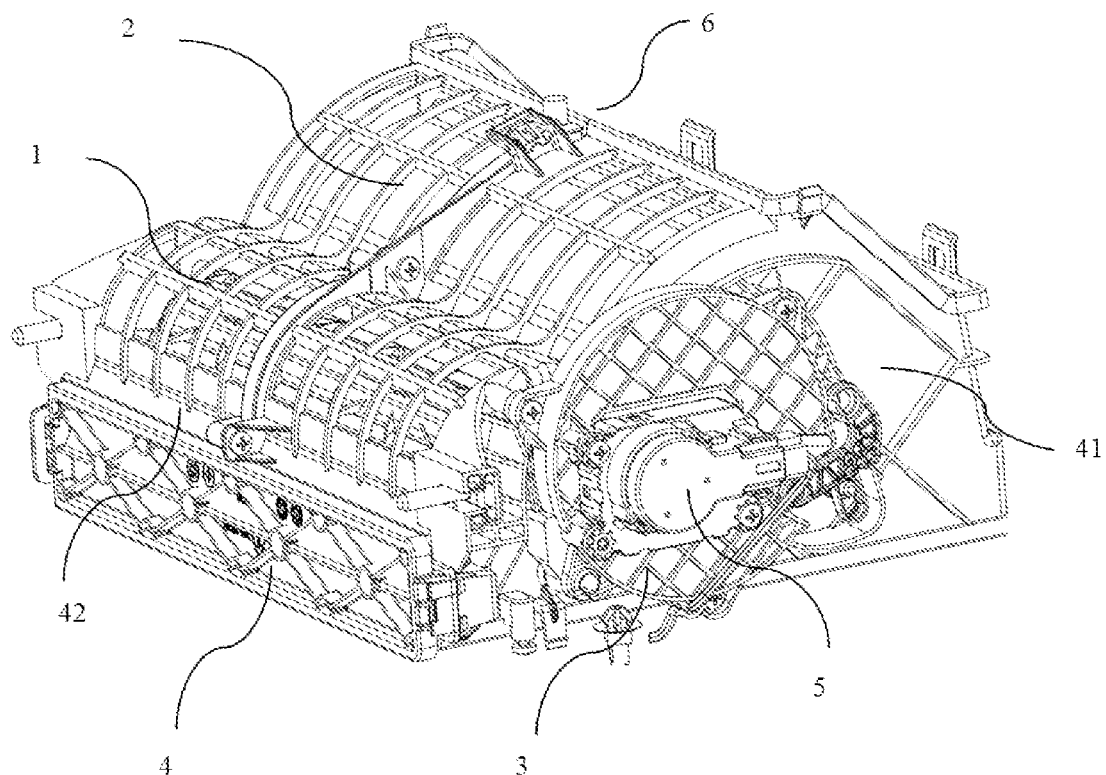
FIG. 1 is a general assembly drawing of an air conditioner according to an embodiment of the present application.

DESCRIPTION OF THE REFERENCE NUMBERS internal-circulation ventilation door 1;
internal ventilation-door plate 11;
internal air-intake opening 111;
internal air-outtake opening 112;
internal end plates 12;
internal connecting shaft 121;
external-circulation ventilation door 2;
external air-door plate 21;
external air-intake opening 211;
external air-outtake opening 212;
external end plates 22;
external connecting shaft 221;
operating dial 3;
internal track 31;
external track 32;
housing 4;
housing sidewall plates 41;
housing connecting plate 42;
internal blocking plate 43;
external blocking plate 44;
motor 5;
fresh-air-intake pipeline 6;
internal operating arm 711;
internal driving arm 712;
external operating arm 721;
external driving arm 722; and
operating-dial base 8.

DETAILED DESCRIPTION OF THE EMBODIMENTS

In order to make the objects, the technical solutions and the advantages of the embodiments of the present application clearer, the technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Merely some illustrative embodiments will be simply described below. As a person skilled in the art can understand, the described embodiments may be modified in various different manners without departing from the spirit or scope of the present application. Therefore, the drawings and the description are considered as essentially illustrative rather than limitative.

In the description of the present application, it should be understood that the terms that indicate orientation or position relations, such as "length", "longitudinal", "transverse", "upper", "lower", "front", "rear", "left", "right", "horizontal", "top", "bottom", "inner", and "outer", are based on the orientation or position relations shown in the drawings, and are merely for conveniently describing the present application and simplifying the description, rather than indicating or implying that the device or element must have the specific orientation and be constructed and operated according to the specific orientation. Therefore, they should not be construed as a limitation on the present application.

Table 1 is a statistical table of the air-intake ratios and the opening angles of the internal-circulation ventilation door and the external-circulation ventilation door in the different modes of the air conditioner according to an embodiment of the present application.

TABLE 1

| | | mode sequence | | | | | | |
|---|---|---|---|---|---|---|---|---|
| | | 1 | 2 | 3 | 4 | 5 | 6 | 7 |
| | | | | | mode | | | |
| | | first mode (fully external) | second mode | third mode | fourth mode | fifth mode | sixth mode (fully internal) | first mode (fully external) |
| ratio | internal air | 0% | 25% | 35% | 55% | 80% | 100% | 0% |
| | external air | 100% | 75% | 65% | 45% | 20% | 0% | 100% |
| actual ratio of ventilation doors | position of external ventilation door | 60° | 60° | 60° | 39° | 21° | 0° | 60° |
| | position of internal ventilation door | 0° | 45° | 75° | 75° | 75° | 75° | 0° |

TABLE 1-continued

| | mode sequence | | | | | | |
|---|---|---|---|---|---|---|---|
| | 1 | 2 | 3 | 4 | 5 | 6 | 7 |
| | | | | mode | | | |
| | first mode (fully external) | second mode | third mode | fourth mode | fifth mode | sixth mode (fully internal) | first mode (fully external) |
| corresponding step(s) of stepping motor | 0 | 1040 | 1840 | 2440 | 3040 | 3840 | 4880 |
| corresponding rotation angle of stepping motor | 0° | 52° | 92 | 122 | 152 | 192 | 244 |

The Embodiments of the Structure of the Air Conditioner

As shown in FIG. 1, the air conditioner according to the present application includes an internal-circulation ventilation door 1, an external-circulation ventilation door 2, an operating dial 3, a housing 4, a motor 5, a fresh-air-intake pipeline 6, a connecting-arm assembly and an operating-dial base 8.

Figure 3:
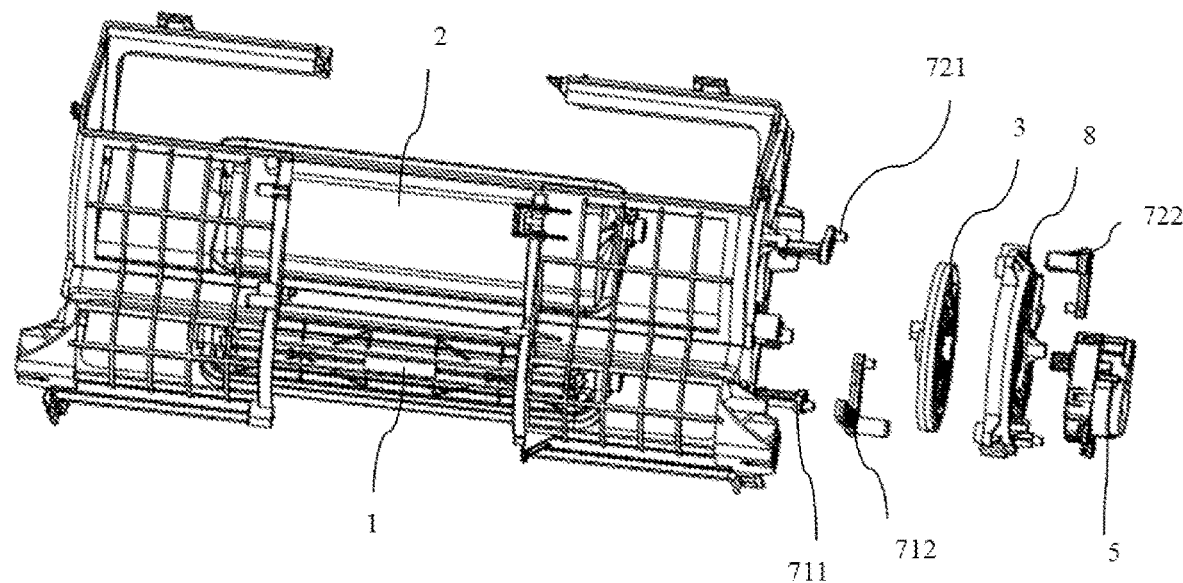
FIG. 3 is an exploded diagram of an air conditioner according to an embodiment of the present application.
Figure 4:
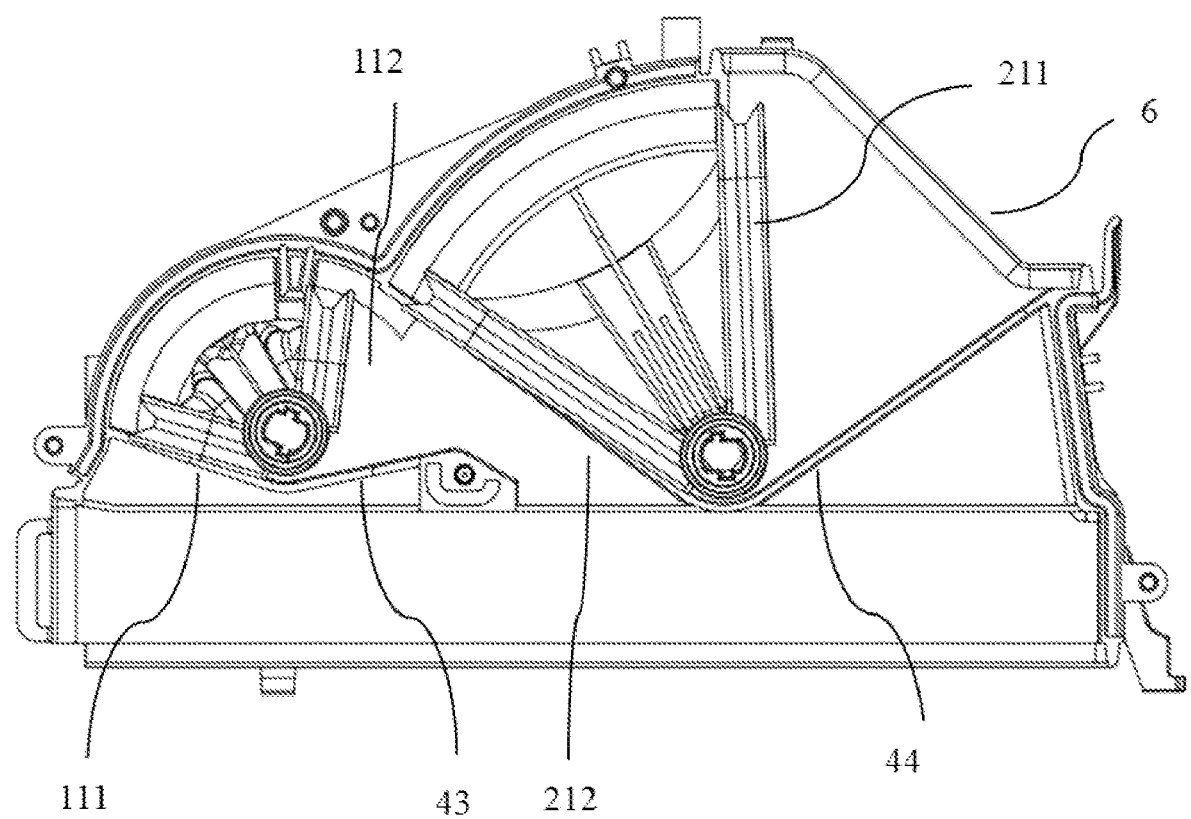
FIG. 4 is a left view of an internal-circulation ventilation door and an external-circulation ventilation door according to an embodiment of the present application.

As shown in FIG. 1, FIG. 3 and FIG. 4, the housing 4 includes two housing sidewall plates 41, a housing connecting plate 42, an internal blocking plate 43 and an external blocking plate 44. The housing sidewall plates 41 are located on the two sides, are connected together by the housing connecting plate 42, and form a hollow cavity therebetween. The hollow cavity is used for disposing the internal-circulation ventilation door 1 and the external-circulation ventilation door 2. The internal blocking plate 43 and the external blocking plate 44 are also provided inside the hollow cavity. The internal blocking plate 43 and the external blocking plate 44 are used in cooperation with the internal-circulation ventilation door 1 and the external-circulation ventilation door 2, respectively.

In the present embodiment, the housing sidewall plate 41 is provided with a first hole and a second hole, which are used to connect the internal and external-circulation ventilation doors to the operating dial 3. The housing 4 according to the present embodiment is of a grid structure, which is provided in order to facilitate the outputting of the internal and external circulating winds. The shape of the housing 4 according to the present embodiment matches with the shapes of the internal-circulation ventilation door 1 and the external-circulation ventilation door 2 to the greatest extent, with a certain distance therebetween. Practically, the specific shape and structure of the housing 4 may be freely configured, as long as it is capable of encircling the internal and external-circulation ventilation doors and discharge the air therein.

Figure 2:
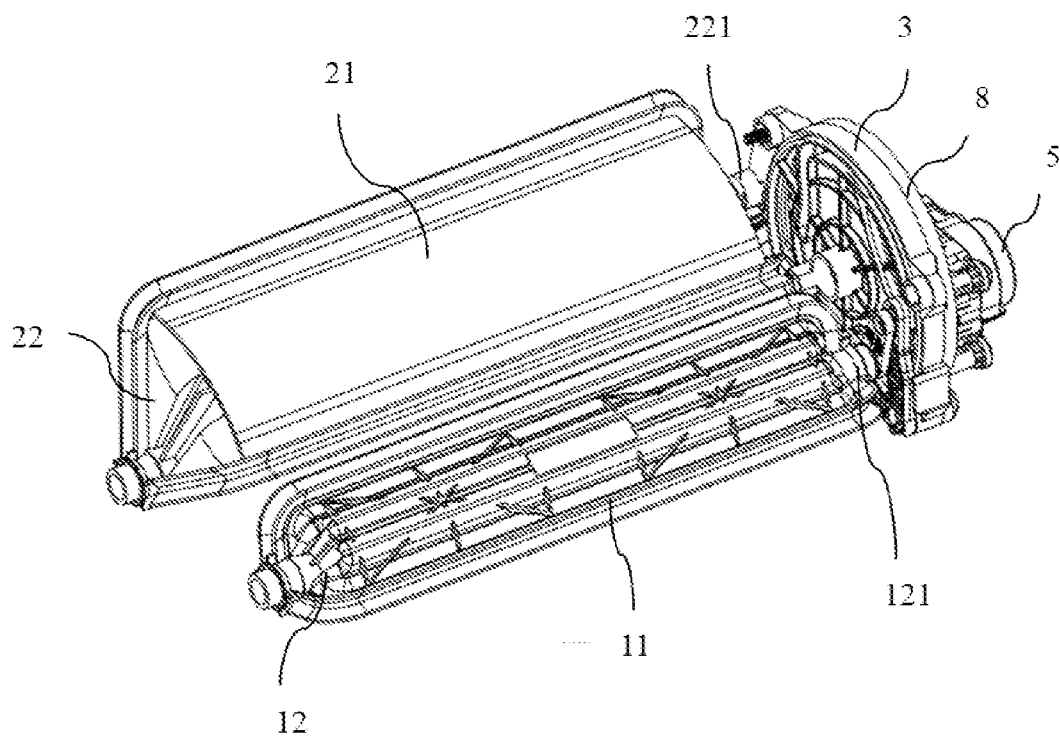
FIG. 2 is a structural diagram of the installation of an internal-circulation ventilation door, an external-circulation ventilation door, a mode operating dial and a motor according to an embodiment of the present application.

As shown in FIG. 2, FIG. 3 and FIG. 4, the internal-circulation ventilation door 1 is disposed inside the cavity formed by the housing 4, and includes an internal air-door plate 11 and two internal end plates 12, and the two internal end plates 12 are connected by the internal air-door plate 11. The internal end plates 12 according to the present embodiment are sector-shaped. As shown in FIG. 4, the two internal end plates 12 and the internal air-door plate 11 form an internal air-intake opening 111 and an internal air-outtake opening 112. The internal air-intake opening is close to the internal blocking plate 43, and the internal air-outtake opening is away from the internal blocking plate 43. As shown in FIG. 2, an internal connecting shaft 121 is provided at one end of the internal end plates 12, and the internal connecting shaft 121 passes through the first hole and is fixed to the operating dial 3. The internal connecting shaft 121 drives the internal air-door plate 11 to rotate around the first hole, so that the internal air-door plate 11 rotates, whereby the internal air-door plate 11 is to abut or leave the internal blocking plate 43, so as to control the closing or opening of the internal air-intake opening, and further control the air-intake volume of the internal air-intake opening 111.

As shown in FIG. 2, FIG. 3 and FIG. 4, the external-circulation ventilation door 2 has a structure similar to that of the internal-circulation ventilation door 1, and is adjacent to the internal-circulation ventilation door 1. The external-circulation ventilation door 2 includes an external air-door plate 21 and two external end plates 22. The two external end plates 22 are connected together by the external air-door plate 21. The two external end plates 22 are also sector-shaped. Furthermore, the two external end plates 22 and the external air-door plate 21 form an external air-intake opening 211 and an external air-outtake opening 212, of which the external air-outtake opening is close to the external blocking plate 44. As shown in FIG. 2, an external connecting shaft 221 is provided at one end of the external end plates 22, and the external connecting shaft 221 passes through the second hole and is fixed to the operating dial 3. The external connecting shaft 221 drives the external air-door plate 21 to rotate around the second hole, so that the external air-door plate 21 rotates, whereby the external air-door plate 21 is to abut or leave the external blocking plate 44, so as to control the closing or opening of the external air-outtake opening, and further control the air-outtake volume of the external air-outtake opening 211.

As shown in FIG. 1 and FIG. 4, the air conditioner according to the present application further includes the fresh-air-intake pipeline 6, and the fresh-air-intake pipeline 6 communicates with the external air-outtake opening 211 in air. The fresh-air-intake pipeline 6 is used to intake the air in the external environment, and can continuously provide fresh air to the air conditioner, and its specific shape may be freely configured according to practical usage conditions, and is not limited herein.

Figure 5:
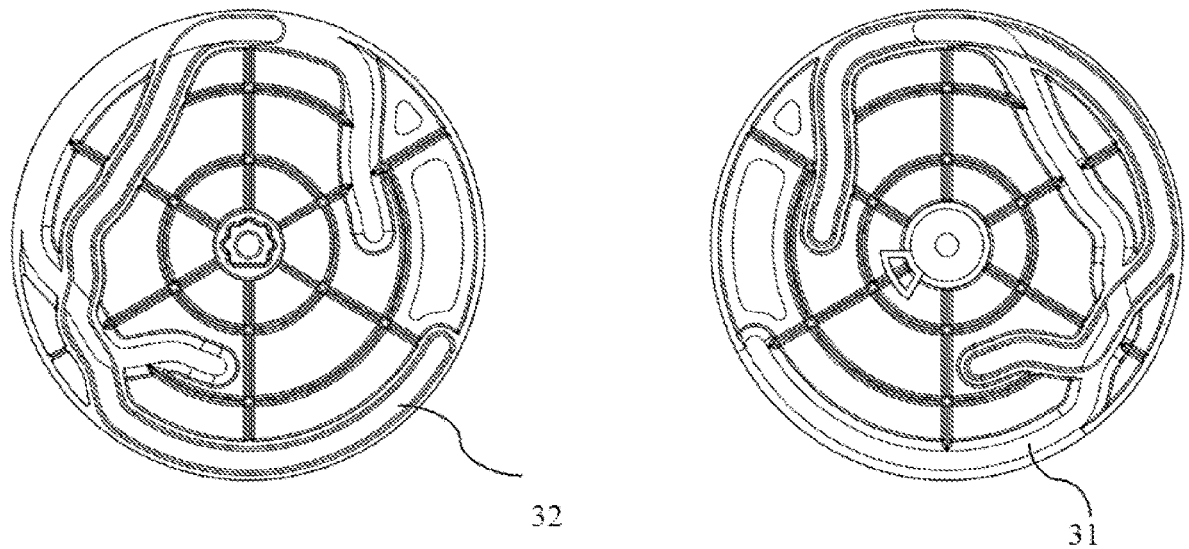
FIG. 5 is a schematic diagram of an internal track and an external track of an operating dial according to an embodiment of the present application.

As shown in FIG. 2, FIG. 3 and FIG. 5, the operating dial 3 according to the present embodiment is disc-shaped, and an internal track 31 and an external track 32 are provided at the two surfaces of the operating dial 3. The internal connecting shaft 121 passes through the first hole and slides in the internal track 31, so as to drive the internal air-door plate 11 to rotate, and to open or close the air-intake opening of the internal-circulation ventilation door. Similarly, the external connecting shaft 221 passes through the second hole and slides in the external track 32, so as to open or close the air-outtake opening of the external-circulation ventilation door. By regulating the sliding paths of the internal connecting shaft 121 and the external connecting shaft 221 in the tracks, the opening angles of the internal and external-circulation ventilation doors may be regulated, thereby achieving the purpose of mixing and outputting the air in the internal-circulation ventilation door 1 and the external-circulation ventilation door 2.

The rotation of the operating dial 3 requires the driving of the motor 5. The motor according to the present application may be a stepping motor, and the rotation of the operating dial 3 is controlled according to the step count of the motor.

As shown in FIG. 3, the internal connecting shaft 121 and the external connecting shaft 221 may also be connected to the operating dial 3 by using the connecting-arm assembly. Accordingly, the shafts may rotate with more angles, and the surface area of the operating dial 3 can be used to the greatest extent to form the tracks. The connecting-arm assembly includes an internal connecting-arm assembly and an external connecting-arm assembly, which are used to connect the internal connecting shaft 121 and the external connecting shaft 221, respectively.

The internal connecting-arm assembly includes an internal operating arm 711 and an internal driving arm 712. One end of the internal operating arm 711 passes through the first hole and is fixedly connected to the internal connecting shaft 121, and the other end is fixedly connected to one end of the internal driving arm 712. The other end of the internal driving arm 712 is fixed to the operating dial 3, so as to achieve the purpose of driving the internal-circulation ventilation door 1 by the operating dial 3.

It should be noted that both of the internal driving arm 712 and the internal operating arm 711 have a zig-zag structure Such a configuration is for reducing the surface area of the operating dial 3, and enabling the internal-circulation ventilation door 1 to rotate by a larger distance while the operating dial 3 rotates by a smaller angle. Furthermore, in the present embodiment, the internal driving arm is connected to the internal track of the operating dial on the surface that is closer to the internal-circulation ventilation door 1.

The external connecting-arm assembly has a similar structure to that of the internal connecting-arm assembly, and includes an external operating arm 721 and an external driving arm 722. One end of the external operating arm 721 passes through the second hole and is fixedly connected to the external connecting shaft 221, and the other end is fixedly connected to one end of the external driving arm 722. The other end of the external driving arm 722 is fixed to the operating dial 3, so as to achieve the purpose of driving the external-circulation ventilation door 2 by the operating dial 3.

It should be noted that both of the external driving arm 722 and the external operating arm 721 have a zig-zag structure. Such a configuration is for reducing the surface area of the operating dial 3, and enabling the external-circulation ventilation door 2 to rotate by a larger distance while the operating dial 3 rotates by a smaller angle. However, as different from the internal connecting-arm assembly, in the present embodiment, the external driving arm is connected to the external track of the operating dial on the surface that is away from the external-circulation ventilation door 2.

The present application further includes the operating-dial base 8. The operating-dial base 8 is fixed between the operating dial 3 and the motor. One surface of the operating-dial base 8 is bonded and fixed to the operating dial 3, and the other surface is fixed to the motor. Therefore, the rotation of the motor can drive the operating-dial base 8 and the operating dial to rotate together.

The Embodiments of the Operating Method of an Air Conditioning System

As shown in FIG. 1, in the air conditioner according to the present application, the motor 5 drives the operating dial 3, so as to cause different opening angles of the internal-circulation ventilation door 1 and the external-circulation ventilation door 2, to achieve the purpose of different internal and external air-intake ratios.

As shown in FIG. 12, the operating method of the air conditioning system for a vehicle according to the present application mainly includes the following steps:
1) receiving a pulse signal by an air-conditioner controlling unit, wherein the pulse signal includes a preset direction of rotation and a preset step count of rotation of a stepping motor; and
2) driving the stepping motor to rotate in the preset direction by the preset step count by the air-conditioner controlling unit, to drive an operating dial to rotate, so as to cause an internal-circulation ventilation door to rotate to a first preset angle, and cause an external-circulation ventilation door to rotate to a second preset angle, so that an air-intake ratio of an internal air-intake volume to an external air-intake volume is a preset first ratio.

According to the above-described steps, the present application provides six operation modes in order to be applied to different vehicle operation conditions, which will be described individually below.

Figure 6:
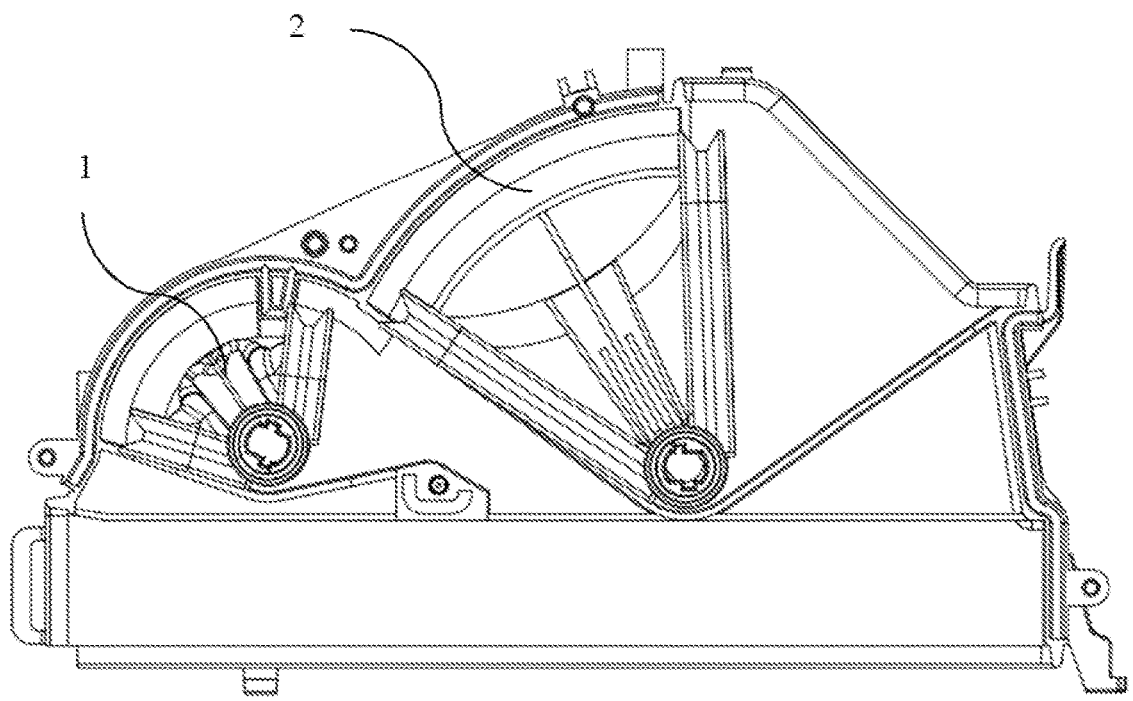
FIG. 6 is a schematic diagram of the first mode of the internal-circulation ventilation door and the external-circulation ventilation door according to an embodiment of the present application.

The First Mode:

As shown in Table 1 and FIG. 5 and FIG. 6, in this case, after the pulse signal is received by the air-conditioner controlling unit, the air-conditioner controlling unit drives the stepping motor to rotate in the counterclockwise direction by a step count of 0, and the corresponding angle of the rotation is 0. In other words, the stepping motor is in the original position. The internal-circulation ventilation door is in the original position, and at this point the angle is 0°, and the external-circulation ventilation door is also in the original position, and the angle is 60°. At this point, the air-intake ratio of the internal air-intake volume to the external air-intake volume is 0:100. In other words, at this point, the internal-circulation ventilation door is completely closed, the air-intake opening of the external-circulation ventilation door is fully opened, and the system is in the fully-external-circulation mode. This mode is mainly applied to the conditions of defrosting, defogging and aeration of the entire vehicle.

Figure 7:
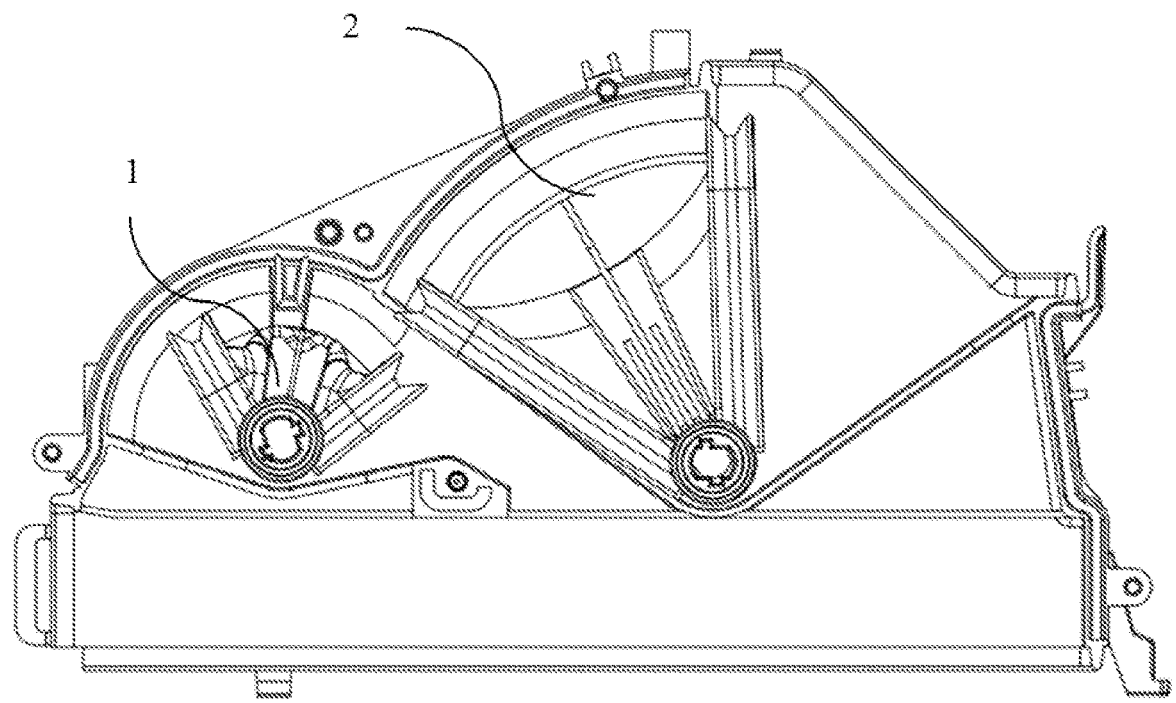
FIG. 7 is a schematic diagram of the second mode of the internal-circulation ventilation door and the external-circulation ventilation door according to an embodiment of the present application.

The Second Mode:

As shown in Table 1 and FIG. 5 and FIG. 7, in this case, after the pulse signal is received by the air-conditioner controlling unit, the air-conditioner controlling unit drives the stepping motor to rotate in the counterclockwise direction by a step count of 1040 steps, and the corresponding angle of the rotation is 52°. In other words, the stepping motor rotates counterclockwise by 52° from the original position. The corresponding angle of the rotation of the internal-circulation ventilation door is 45°. The external-circulation ventilation door is in the original position, and the angle is 60°. At this point, the air-intake ratio of the internal air-intake volume to the external air-intake volume is 25:75. In other words, at this point, the internal-circulation ventilation door is partially closed, and the air-intake opening of the external-circulation ventilation door is fully opened.

This mode is mainly applied to the conditions of a sudden increasing of the vehicle speed or rapid acceleration. In this case, if the air conditioner is in the state of fully external circulation of the first mode, the air-intake volume of fresh air of the air conditioner is increased, which very easily causes the air-conditioner windy motion of the dash board of the entire vehicle, and fluctuation of the wind speed at the air-outtake opening of the air-conditioner panel. Therefore, in the second mode, the internal-circulation panel is partially opened, which may alleviate the fluctuation of the air-intake volume caused by the rapid acceleration of the entire vehicle, to maintain a stable wind speed at the air-outtake opening, and improve the comfort of the driver and the passengers.

The air-conditioner controlling unit may automatically perform the switching from the first mode to the second mode, which includes the following steps:
1) The air-conditioner controlling unit determines the vehicle-speed variation value A, and compares it with a first preset value that is set in advance.
2) If the vehicle-speed variation value A is larger than or equal to the first preset value, the next step is executed, wherein the first preset value is 30 km/h in the present application, and may also be set to be another calibrated value.
3) The air-conditioner controlling unit determines the blower blast-volume shift V, and when the blast-volume shift V is less than or equal to a second preset value, the next step is executed, wherein the second preset value is 4 in the present application, or another calibrated value.
4) The air-conditioner controlling unit determines whether the system is in the fully-external-circulation mode of the first mode, i.e., whether the first preset angle of the rotation of the internal-circulation ventilation door is 0°, and whether the second preset angle of the rotation of the external-circulation ventilation door is 60°. If yes, then the second mode is executed.

Figure 8:
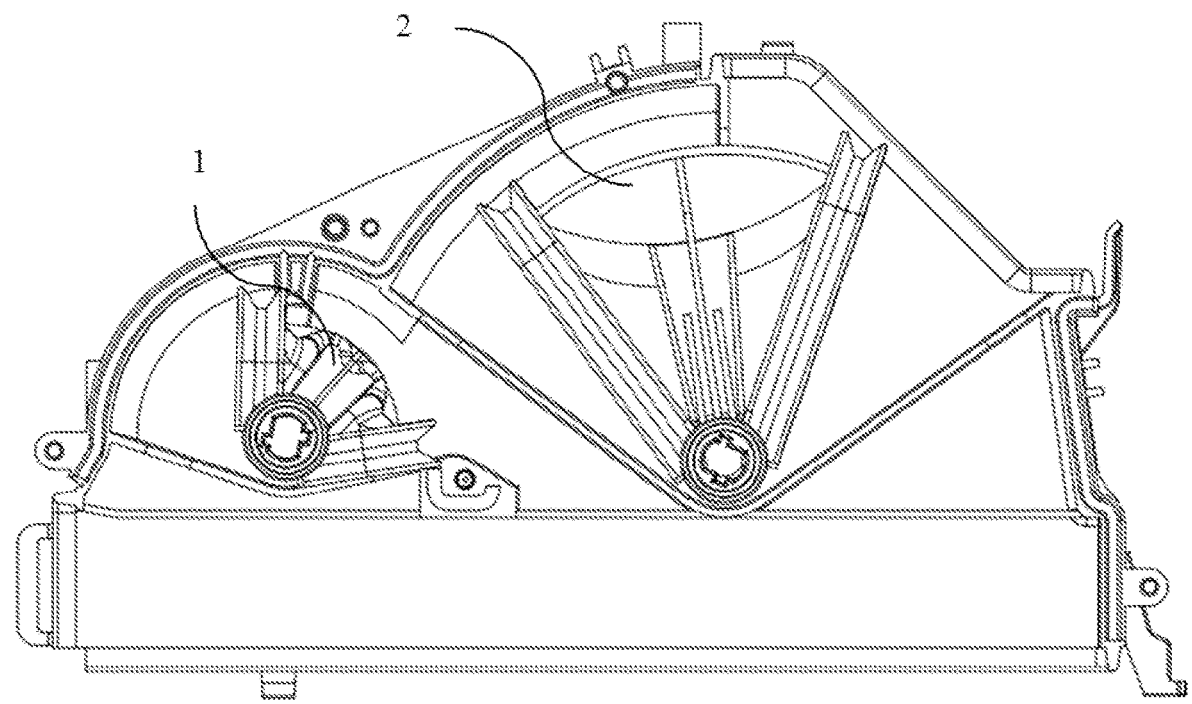
FIG. 8 is a schematic diagram of the third mode of the internal-circulation ventilation door and the external-circulation ventilation door according to an embodiment of the present application.

After the vehicle speed reaches the stable state, the previous mode state may be returned to, i.e., the first mode.
The Third Mode:
As shown in Table 1 and FIG. 5 and FIG. 8, in this case, after the pulse signal is received by the air-conditioner controlling unit, the air-conditioner controlling unit drives the stepping motor to rotate in the counterclockwise direction by a step count of 1840 steps, and the corresponding angle of the rotation is 92°. In other words, the stepping motor rotates counterclockwise by 40° from the position of the second mode. The corresponding angle of the rotation of the internal-circulation ventilation door is 75°. The external-circulation ventilation door is in the original position, and the angle is 60°. At this point, the air-intake ratio of the internal air-intake volume to the external air-intake volume is 35:65. In other words, at this point, the opened degree of the internal-circulation ventilation door is more than that in the second mode, and the air-intake opening of the external-circulation ventilation door is fully opened.

This mode is mainly applied to the heating process during the travelling of the vehicle. In this mode, it can not only achieve quickly heat, but also reduce fogging at the front windshield during travelling. In this mode, quickly heat can be achieved, and it may regulate the air-heating power if a high-pressure air heater is equipped, so as to save the electric quantity of the entire vehicle with a low air-heating power, and increase the endurance mileage of new-energy vehicles.

The air-conditioner controlling unit may automatically perform the switching to the third mode, which particularly includes the following steps:
1) The air-conditioner controller determines the temperature intervals or the speed interval of an outdoor temperature T1, an engine water temperature T2, a preset air-conditioner temperature T3, an indoor temperature T4 and a vehicle-speed signal V1.
2) If the outdoor temperature T1 is less than or equal to −10° C. or T1 is larger than −10° C. but less than or equal to 10° C. (the first temperature interval), the engine water temperature T2 is larger than 60° C. but less than or equal to 90° C. (the second temperature interval), the preset air-conditioner temperature T3 is larger than or equal to 23° C. but less than 28° C. (the third temperature interval), the vehicle-speed signal V1 is larger than 80 km/h but less than or equal to 120 km/h (the first speed interval), and the preset air-conditioner temperature T3 is greater than the indoor temperature T4 by a temperature difference $\Delta T=T3-|T4|\leq 5°$ C. (the first preset temperature difference), then, at this point, the third mode is executed.

At this point, the air intake is at a low-shift ratio of the mixed air of the internal circulation, the cool and warm ventilation doors are driven by the stepping motor for the regulation, the air volume of the blower is automatically regulated according to the calibrated value, and the air heater of the electrically driven vehicle operates at an intermediate power at the same time.

Figure 9:
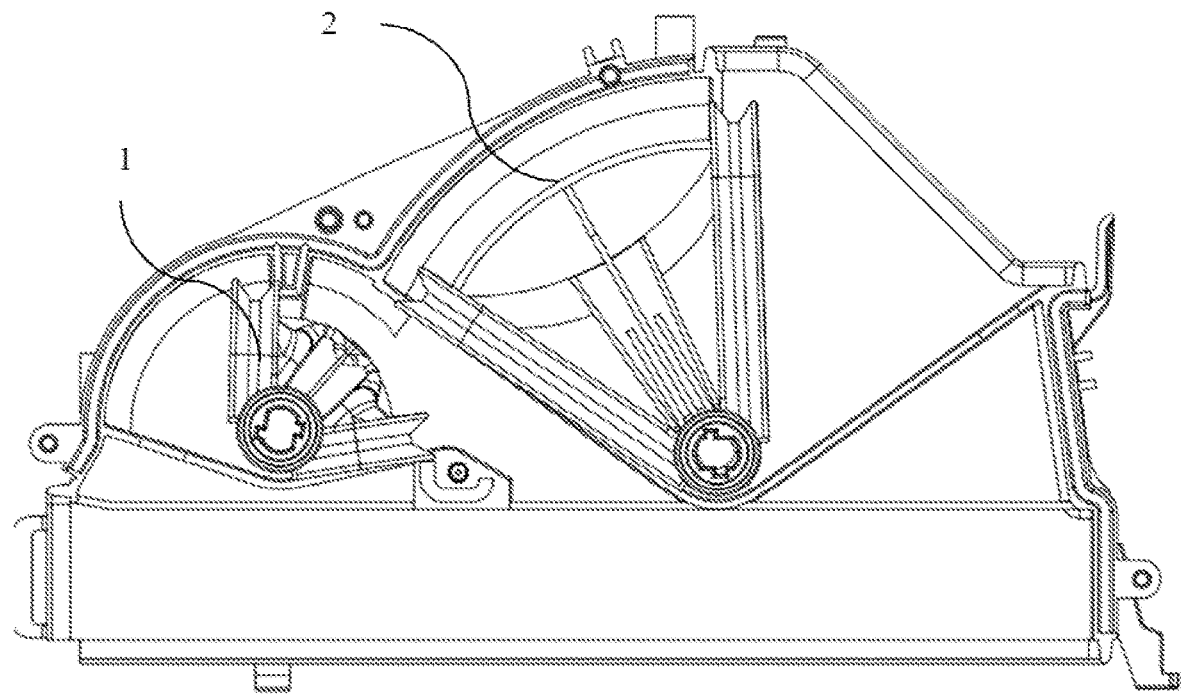
FIG. 9 is a schematic diagram of the fourth mode of the internal-circulation ventilation door and the external-circulation ventilation door according to an embodiment of the present application.

It should be noted that, if the outdoor temperature T1 is larger than or equal to 20° C., then the third mode is not executed.
The Fourth Mode:
As shown in Table 1 and FIG. 5 and FIG. 9, in this case, after the pulse signal is received by the air-conditioner controlling unit, the air-conditioner controlling unit drives the stepping motor to rotate in the counterclockwise direction by a step count of 2440 steps, and the corresponding angle of the rotation is 122°. In other words, the stepping motor rotates counterclockwise by 30° from the position of the third mode. The corresponding angle of the rotation of the internal-circulation ventilation door is 75°. The external-circulation ventilation door is in the original position, and the angle is 39°. At this point, the air-intake ratio of the internal air-intake volume to the external air-intake volume is 55:45. In other words, at this point, the opened degree of the internal-circulation ventilation door is more than that in the third mode, and the air-intake opening of the external-circulation ventilation door is partially closed.

The air-intake volume of the internal circulation of this mode is increased as compared with the third mode. As similar to the third mode, this mode is mainly applied to the heating process during the travelling of the vehicle. In this mode, it can not only achieve quickly heat, but can also reduce fogging at the front windshield during travelling. In this mode, it may achieve quickly heat, and it may regulate the air-heating power if a high-pressure air heater is equipped, so as to save the electric quantity of the entire vehicle with a low air-heating power, and increase the endurance mileage of new-energy vehicles.

The air-conditioner controlling unit may automatically perform the switching to the fourth mode, which particularly includes the following steps:
1) The air-conditioner controller determines an outdoor temperature T1, an engine water temperature T2, a preset air-conditioner temperature T3, an indoor temperature T4 and a vehicle-speed signal V1.

2) If the outdoor temperature T1 is less than or equal to −10° C. or T1 is larger than −10° C. but less than or equal to 10° C., the engine water temperature T2 is larger than 40° C. but less than or equal to 60° C., the preset air-conditioner temperature T3 is larger than or equal to 28° C. but less than 33° C., the vehicle-speed signal V1 is larger than 0 km/h but less than or equal to 80 km/h, and the preset air-conditioner temperature T3 is greater than the indoor temperature T4 by a temperature difference ΔT=T3−|T4|, ΔT is larger than 5° C. but less than 10° C., then, at this point, the fourth mode is executed.

There is another case. If the outdoor temperature T1 is larger than or equal to 10° C., the engine water temperature T2 is larger than 40° C. but less than or equal to 60° C., the preset air-conditioner temperature T3 is larger than or equal to 23° C. but less than 33° C., the vehicle-speed signal V1 is larger than 0 km/h but less than or equal to 120 km/h, and the preset air-conditioner temperature T3 is greater than the indoor temperature T4 by a temperature difference ΔT=T3−|T4|, ΔT is less than 5° C., then, at this point, the fourth mode is executed.

At this point, the air intake is at an intermediate-shift ratio of the mixed air of the internal circulation, the cool and warm ventilation doors are driven by the stepping motor for the regulation, the air volume of the blower is automatically regulated according to the calibrated value, and the air heater of the electrically driven vehicle synchronously operates at an intermediate power.

It should be noted that, if the outdoor temperature T1 is larger than or equal to 20° C., then the fourth mode is not executed.

Figure 10:
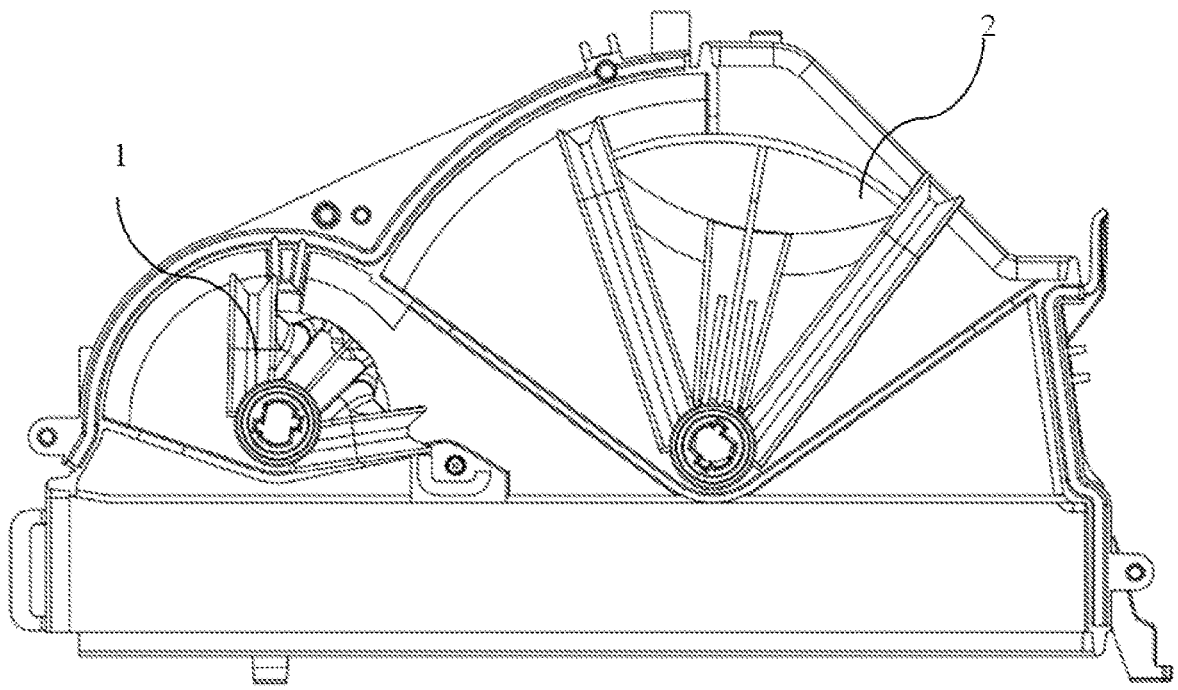
FIG. 10 is a schematic diagram of the fifth mode of the internal-circulation ventilation door and the external-circulation ventilation door according to an embodiment of the present application.

The Fifth Mode:

As shown in Table 1 and FIG. 5 and FIG. 10, in this case, after the pulse signal is received by the air-conditioner controlling unit, the air-conditioner controlling unit drives the stepping motor to rotate in the counterclockwise direction by a step count of 3040 steps, and the corresponding angle of the rotation is 152°. In other words, the stepping motor rotates counterclockwise by 30° from the position of the fourth mode. The corresponding angle of the rotation of the internal-circulation ventilation door is 75°. The external-circulation ventilation door is in the original position, and the angle is 21°. At this point, the air-intake ratio of the internal air-intake volume to the external air-intake volume is 80:20. In other words, at this point, the opened degree of the internal-circulation ventilation door is more than that in the fourth mode, and the air-intake opening of the external-circulation ventilation door is partially closed.

The air-intake volume of the internal circulation of this mode is increased as compared with the fourth mode. As similar to the fourth mode, this mode is mainly applied to the heating process during the travelling of the vehicle. In this mode, it can not only achieve quickly heat, but can also reduce fogging at the front windshield during travelling. In this mode, it may achieve quickly heat, and it may regulate the air-heating power when a high-pressure air heater is equipped, so as to save the electric quantity of the entire vehicle with a low air-heating power, and increase the endurance mileage of new-energy vehicles.

The air-conditioner controlling unit may automatically perform the switching to the fifth mode, which particularly includes the following steps:

1) The air-conditioner controller determines an outdoor temperature T1, an engine water temperature T2, a preset air-conditioner temperature T3, an indoor temperature T4 and a vehicle-speed signal V1.

2) If the outdoor temperature T1 is less than or equal to −10° C. or T1 is larger than −10° C. but less than or equal to 10° C., the engine water temperature T2 is less than or equal to 40° C., the preset air-conditioner temperature T3 is larger than or equal to 33° C., the vehicle-speed signal is in the state of idle speed (i.e., the state in which the engine idles and does not do work), and the preset air-conditioner temperature T3 is greater than the indoor temperature T4 by a temperature difference ΔT=T3−|T4|, ΔT is larger than or equal to 10° C., then, at this point, the fifth mode is executed.

There is another case. If the outdoor temperature T1 is larger than or equal to 10° C., the engine water temperature T2 is less than or equal to 40° C., the preset air-conditioner temperature T3 is larger than or equal to 33° C., the vehicle-speed signal is in the state of idle speed (i.e., the state in which the engine idles and does not do work), and the preset air-conditioner temperature T3 is greater than the indoor temperature T4 by a temperature difference ΔT=T3−|T4|, ΔT is larger than or equal to 5° C., then, at this point, the fifth mode is executed.

At this point, the air intake is at the highest-shift ratio of the mixed air of the internal circulation, which may quickly increase the air-intake temperature, the cool and warm ventilation doors are driven by the stepping motor for the regulation at the highest shift of the warm end, the air volume of the blower is automatically regulated according to the calibrated value, and the air heater of the electrically driven vehicle operates at the highest power at the same time.

It should be noted that, if the outdoor temperature T1 is larger than or equal to 20° C., then the fifth mode is not executed.

The Sixth Mode:

As shown in Table 1 and FIG. 5 and FIG. 11, in this case, after the pulse signal is received by the air-conditioner controlling unit, the air-conditioner controlling unit drives the stepping motor to rotate in the counterclockwise direction by a step count of 3840 steps, and the corresponding angle of the rotation is 192°. In other words, the stepping motor rotates counterclockwise by 40° from the position of the fifth mode. The corresponding angle of the rotation of the internal-circulation ventilation door is 75°, and the angle for the external-circulation ventilation door is 21°. At this point, the air-intake ratio of the internal air-intake volume to the external air-intake volume is 100:0. In other words, at this point, the internal-circulation ventilation door is completely opened, and the air-intake opening of the external-circulation ventilation door is fully closed. At this point, the system is in a fully-internal-circulation mode, which is mainly adapted for the working condition of heating, or the working condition in which the external air has a poor quality.

As shown in Table 1 and FIG. 5, if the air-conditioner controlling unit continues receiving the pulse signal at this point, then the air-conditioner controlling unit continues driving the stepping motor to rotate in the counterclockwise direction by a step count of 4880 steps, and the corresponding angle of the rotation is 244°. In other words, the stepping motor rotates counterclockwise by 52° from the position of the sixth mode. The corresponding angle of the rotation of the internal-circulation ventilation door is 0°. The angle for the external-circulation ventilation door is 60°. At this point, the air-intake ratio of the internal air-intake volume to the external air-intake volume is 0:100. In other words, at this point, the external-circulation ventilation door is completely opened, and the air-intake opening of the internal-circulation ventilation door is fully closed. The system returns to the state of the first mode.

The internal-external-circulation double-air-door ratio-regulation mode in the second mode according to the present embodiment may have an additional vehicle-speed-compensation mixed-wind mode, which may reduce the air-intake ratio of the external circulation in the process of rapid acceleration of the entire vehicle, to maintain the wind speed at the air-outtake opening at the preset value, to reduce the fluctuation of the wind speed, and improve the comfort of the driver and the passengers.

In the third mode, the fourth mode and the fifth mode according to the present embodiment, for new-energy vehicles, in the process of heating for travelling in the winter, the internal-external-circulation double-air-door ratio-regulation is applied, to increase the air-intake temperature of the air conditioning system, in which case the high-pressure air heater does not require the 100% full power, and may operate at a low power, to save the electric quantity of the entire vehicle, and increase the endurance mileage of new-energy vehicles.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Some or all of the modules may be selected according to the actual demands to realize the purposes of the solutions of the embodiments. A person skilled in the art can understand and implement the technical solutions without paying creative work.

The "one embodiment", "an embodiment" or "one or more embodiments" as used herein means that particular features, structures or characteristics described with reference to an embodiment are included in at least one embodiment of the present application. Moreover, it should be noted that here an example using the wording "in an embodiment" does not necessarily refer to the same one embodiment.

The description provided herein describes many concrete details. However, it can be understood that the embodiments of the present application may be implemented without those concrete details. In some of the embodiments, well-known processes, structures and techniques are not described in detail, so as not to affect the understanding of the description.

In the claims, any reference signs between parentheses should not be construed as limiting the claims. The word "include" does not exclude elements or steps that are not listed in the claims. The word "a" or "an" preceding an element does not exclude the existing of a plurality of such elements. The present application may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present application, and not to limit them. Although the present application is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

The invention claimed is:

1. An operating method of an air conditioning system for a vehicle, wherein the air conditioning system comprises a motor, an operating dial, an internal-circulation ventilation door and an external-circulation ventilation door, the motor is fixedly connected to the operating dial, the operating dial is provided with an internal-circulation track and an external-circulation track, the internal-circulation ventilation door and the external-circulation ventilation door are provided with an internal connecting shaft and an external connecting shaft, respectively, the internal connecting shaft and the external connecting shaft are capable of sliding in the internal-circulation track and the external-circulation track, respectively, to drive the internal-circulation ventilation door and the external-circulation ventilation door to rotate, and the operating method of the air conditioning system comprises:

receiving a pulse signal, wherein the pulse signal comprises a preset direction of rotation and a preset step count of rotation of the motor; and driving the motor to rotate in the preset direction by the preset step count, to drive the operating dial to rotate, so as to cause the internal-circulation ventilation door to rotate to a first preset angle, and the external-circulation ventilation door to rotate to a second preset angle, so that an air-intake ratio of an internal air-intake volume to an external air-intake volume of the air conditioning system is a preset first ratio;

wherein in a preset second air-conditioning-system operation mode, the air conditioning system operates as:

the preset direction is a counterclockwise direction, the preset step count is 1040 steps, the internal-circulation ventilation door rotates to the first preset angle of 45°, and the external-circulation ventilation door rotates to the second preset angle of 60°, so that the air-intake ratio of the internal air-intake volume to the external air-intake volume of the air conditioning system is 25:75;

wherein the operating method further comprises:

comparing a vehicle-speed variation value with a first preset value;

when the vehicle-speed variation value exceeds the first preset value, comparing a blower blast-volume shift of the air conditioning system with a second preset value;

when the blower blast-volume shift is less than the second preset value, determining whether the internal-circulation ventilation door rotates to the first preset angle of 0° and whether the external-circulation ventilation door rotates to the second preset angle of 60°; and when the first preset angle is 0° and the second preset angle is 60°, executing the second air-conditioning-system operation mode.

2. The operating method of the air conditioning system according to claim 1, wherein in a preset first air-conditioning-system operation mode, the air conditioning system operates as:

the preset direction is a counterclockwise direction, the preset step count is 0 step, the internal-circulation ventilation door rotates to the first preset angle of 0°, and the external-circulation ventilation door rotates to the second preset angle of 60°, so that the air-intake ratio of the internal air-intake volume to the external air-intake volume of the air conditioning system is 0:100.

3. The operating method of the air conditioning system according to claim 1, wherein in a preset third air-conditioning-system operation mode, the air conditioning system operates as:

the preset direction is a counterclockwise direction, the preset step count is 1840 steps, the internal-circulation ventilation door rotates to the first preset angle of 75°, and the external-circulation ventilation door rotates to the second preset angle of 60°, so that the air-intake ratio of the internal air-intake volume to the external air-intake volume of the air conditioning system is 35:65.

4. The operating method of the air conditioning system according to claim 1, wherein in a preset sixth air-conditioning-system operation mode, the air conditioning system operates as:

the preset direction is a counterclockwise direction, the preset step count is 3840 steps, the internal-circulation ventilation door rotates to the first preset angle of 75°, and the external-circulation ventilation door rotates to the second preset angle of 0°, so that the air-intake ratio of the internal air-intake volume to the external air-intake volume of the air conditioning system is 100:0.

5. The operating method of the air conditioning system according to claim 1, wherein the air conditioning system further comprises:

a housing, wherein the housing comprises two housing sidewall plates, a housing connecting plate, an internal blocking plate and an external blocking plate, the two housing sidewall plates are connected by the housing connecting plate and form a hollow cavity, the internal blocking plate and the external blocking plate are fixed inside the cavity, and the housing sidewall plate comprises a first hole and a second hole;

the internal-circulation ventilation door comprises an internal air-door plate and two internal end plates, the two internal end plates are connected by the internal air-door plate, the two internal end plates and the internal air-door plate form an internal air-intake opening and an internal air-outtake opening, the internal end plate comprises the internal connecting shaft, and the internal connecting shaft passes through the first hole, so as to cause the internal air-door plate to rotate around the first hole, to cause the internal air-door plate to abut or leave the internal blocking plate, to close or open the internal air-intake opening;

the external-circulation ventilation door comprises an external air-door plate and two external end plates, the two external end plates are connected by the external air-door plate, the two external end plates and the external air-door plate form an external air-intake opening and an external air-outtake opening, each of the external end plates comprises the external connecting shaft, the external connecting shaft passes through the second hole, so as to cause the external air-door plate to rotate around the second hole, to cause the external air-door plate to abut or leave the external blocking plate, to close or open the external air-outtake opening, and when the external air-outtake opening opens, the external air-outtake opening communicates with the internal air-outtake opening in air; and the internal connecting shaft passes through the first hole and is capable of sliding in the internal track, to drive the internal air-door plate to rotate, so as to open or close the internal air-intake opening of the internal-circulation ventilation door, and the external connecting shaft passes through the second hole and is capable of sliding in the external track, to drive the external air-door plate to rotate, so as to open or close the external air-outtake opening of the external-circulation ventilation door, to mix and output air in the internal-circulation ventilation door and the external-circulation ventilation door.

6. The operating method of the air conditioning system according to claim 5, wherein the air conditioning system further comprises a connecting-arm assembly, and the connecting-arm assembly comprises:

an internal connecting-arm assembly, wherein the internal connecting-arm assembly comprises an internal operating arm and an internal driving arm, one end of the internal operating arm is fixedly connected to the internal connecting shaft passing through the first hole, the other end of the internal operating arm is fixedly connected to one end of the internal driving arm, and the other end of the internal driving arm is fixedly connected to the operating dial; and an external connecting-arm assembly, wherein the external connecting-arm assembly comprises an external operating arm and an external driving arm, one end of the external operating arm is fixedly connected to the external connecting shaft passing through the first hole, the other end of the external operating arm is fixedly connected to one end of the external driving arm, and the other end of the external driving arm is fixedly connected to the operating dial.

7. The operating method of the air conditioning system according to claim 5, wherein the operating dial is disc-shaped, and the internal track and the external track are located on two sides of the operating dial.

8. The operating method of the air conditioning system according to claim 5, wherein the air conditioning system further comprises an operating-dial base, one surface of the operating-dial base is bonded and fixed to the operating dial, and the other surface is fixed to the motor, to drive the operating-dial base and the operating dial to rotate by using the motor.

9. The operating method of the air conditioning system according to claim 8, wherein the operating-dial base comprises a through hole, and the external driving arm passes through the through hole and is fixedly connected to the operating dial.

10. The operating method of the air conditioning system according to claim 5, wherein the motor is a stepping motor.

11. The operating method of the air conditioning system according to claim 5, wherein the air conditioning system further comprises a fresh-air-intake pipeline, and the fresh-air-intake pipeline is in air communication with the external air-intake opening.

12. An operating method of an air conditioning system for a vehicle, wherein the air conditioning system comprises a motor, an operating dial, an internal-circulation ventilation door and an external-circulation ventilation door, the motor is fixedly connected to the operating dial, the operating dial is provided with an internal-circulation track and an external-circulation track, the internal-circulation ventilation door and the external-circulation ventilation door are provided with an internal connecting shaft and an external connecting shaft, respectively, the internal connecting shaft and the external connecting shaft are capable of sliding in the internal-circulation track and the external-circulation track, respectively, to drive the internal-circulation ventilation door and the external-circulation ventilation door to rotate, and the operating method of the air conditioning system comprises:
- receiving a pulse signal, wherein the pulse signal comprises a preset direction of rotation and a preset step count of rotation of the motor; and
- driving the motor to rotate in the preset direction by the preset step count, to drive the operating dial to rotate, so as to cause the internal-circulation ventilation door to rotate to a first preset angle, and the external-circulation ventilation door to rotate to a second preset angle, so that an air-intake ratio of an internal air-intake volume to an external air-intake volume of the air conditioning system is a preset first ratio;
- wherein in a preset fourth air-conditioning-system operation mode, the air conditioning system operates as:
- the preset direction is a counterclockwise direction, the preset step count is 2440 steps, the internal-circulation ventilation door rotates to the first preset angle of 75°, and the external-circulation ventilation door rotates to the second preset angle of 39°, so that the air-intake ratio of the internal air-intake volume to the external air-intake volume of the air conditioning system is 55:45;
- wherein the method further comprises:
- determining temperature intervals of an outdoor temperature T1, an engine water temperature T2, a preset air-conditioner temperature T3 and an indoor temperature T4, or determining a speed interval of a speed of a vehicle-speed signal V1; and
- when the outdoor temperature T1 is within a first preset temperature interval, the engine water temperature T2 is within a second temperature interval, the preset air-conditioner temperature T3 is within a third temperature interval, the speed of the vehicle-speed signal V1 is within a first speed interval, the preset air-conditioner temperature T3 is greater than the indoor temperature T4 by a first preset temperature difference, and an air conditioner is in a heating demand, executing the third air-conditioning-system operation mode, the fourth air-conditioning-system operation mode or the fifth air-conditioning-system operation mode.

13. An operating method of an air conditioning system for a vehicle, wherein the air conditioning system comprises a motor, an operating dial, an internal-circulation ventilation door and an external-circulation ventilation door, the motor is fixedly connected to the operating dial, the operating dial is provided with an internal-circulation track and an external-circulation track, the internal-circulation ventilation door and the external-circulation ventilation door are provided with an internal connecting shaft and an external connecting shaft, respectively, the internal connecting shaft and the external connecting shaft are capable of sliding in the internal-circulation track and the external-circulation track, respectively, to drive the internal-circulation ventilation door and the external-circulation ventilation door to rotate, and the operating method of the air conditioning system comprises:
- receiving a pulse signal, wherein the pulse signal comprises a preset direction of rotation and a preset step count of rotation of the motor; and
- driving the motor to rotate in the preset direction by the preset step count, to drive the operating dial to rotate, so as to cause the internal-circulation ventilation door to rotate to a first preset angle, and the external-circulation ventilation door to rotate to a second preset angle, so that an air-intake ratio of an internal air-intake volume to an external air-intake volume of the air conditioning system is a preset first ratio;
- wherein in a preset fifth air-conditioning-system operation mode, the air conditioning system operates as:
- the preset direction is a counterclockwise direction, the preset step count is 3040 steps, the internal-circulation ventilation door rotates to the first preset angle of 75°, and the external-circulation ventilation door rotates to the second preset angle of 21°, so that the air-intake ratio of the internal air-intake volume to the external air-intake volume of the air conditioning system is 80:20;
- wherein the method further comprises:
- determining temperature intervals of an outdoor temperature T1, an engine water temperature T2, a preset air-conditioner temperature T3 and an indoor temperature T4, or determining a speed interval of a speed of a vehicle-speed signal V1; and
- when the outdoor temperature T1 is within a first preset temperature interval, the engine water temperature T2 is within a second temperature interval, the preset air-conditioner temperature T3 is within a third temperature interval, the speed of the vehicle-speed signal V1 is within a first speed interval, the preset air-conditioner temperature T3 is greater than the indoor temperature T4 by a first preset temperature difference, and an air conditioner has a heating demand, executing the third air-conditioning-system operation mode, the fourth air-conditioning-system operation mode or the fifth air-conditioning-system operation mode.

* * * * *